C. W. Rawson,
Stump Elevator.
Nº 35,470. Patented June 3, 1862.

Witnesses
Inventor
Charles W Rawson
per Munn & Co
Attorneys

UNITED STATES PATENT OFFICE.

CHARLES W. RAWSON, OF LITTLE PRAIRIE RONDE, MICHIGAN.

IMPROVEMENT IN STUMP-EXTRACTORS.

Specification forming part of Letters Patent No. 35,470, dated June 3, 1862.

*To all whom it may concern:*

Be it known that I, CHARLES W. RAWSON, of Little Prairie Ronde, in the county of Cass and State of Michigan, have invented a new and Improved Stump-Extractor; and I do hereby declare that the following is a full, clear, and exact description of the same, reference being had to the accompanying drawings, making a part of this specification, in which—

Figure 1:
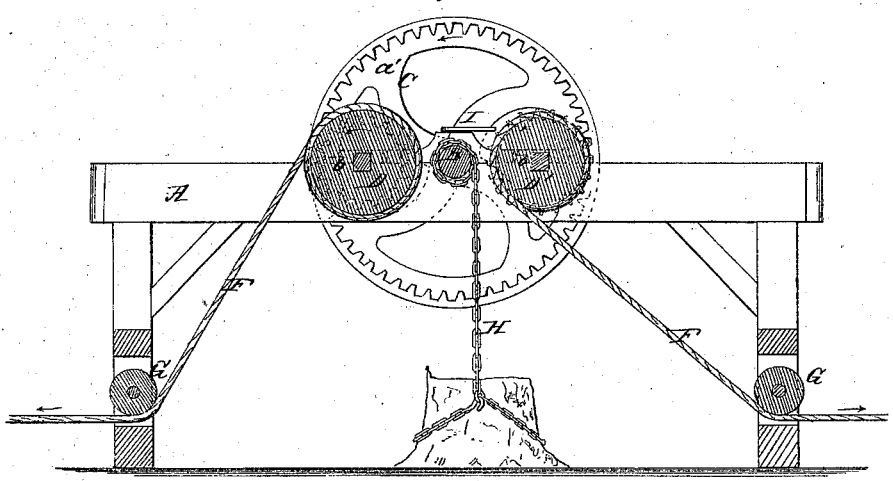
Figure 2:
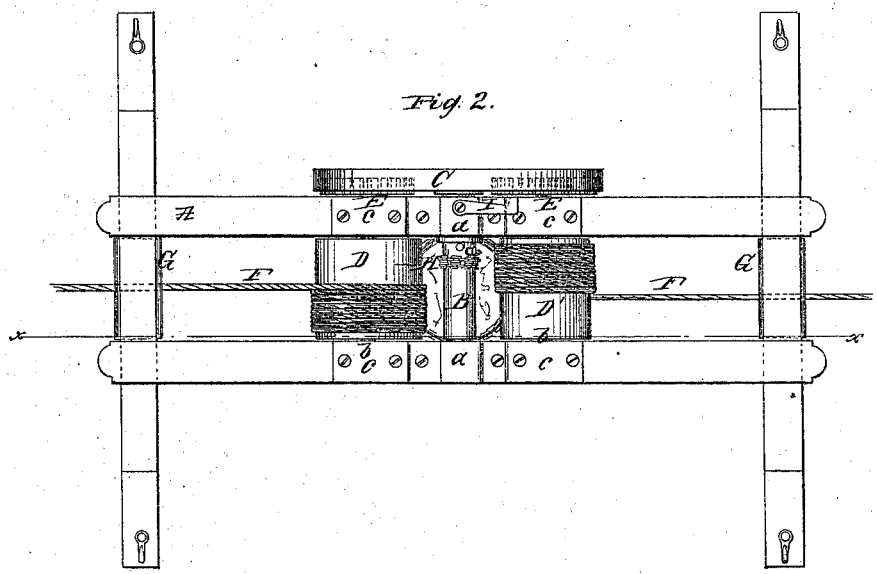

Figure 1 is a side sectional view of my invention, taken in the line $x\,x$, Fig. 2. Fig. 2 is a plan or top view of the same.

Similar letters of reference indicate corresponding parts in the two figures.

The object of this invention is to obtain a stump-extractor of simple construction, which may be readily drawn from place to place where required for use and be capable of being operated by one or two horses, as circumstances may require.

To this end the invention consists in applying to a shaft on which the lifting-chain is wound a wheel toothed at its inner periphery to receive at opposite points the pinions of two drum-shafts, on which ropes are wound in the same direction, the horses being attached to said ropes, and all arranged as hereinafter fully shown and described.

To enable those skilled in the art to fully understand and construct my invention, I will proceed to describe it.

A represents a framing of rectangular form, having on its upper part a shaft, B, which is fitted in suitable bearings, $a\,a$, and having a wheel, C, at one end, which is provided with teeth $a'$ at the inner side of its periphery, as shown in Fig. 1.

D D' are two drums, which are placed on the framing A parallel with the shaft B, and one at each side of it. The shafts $b\,b$ of these drums are fitted in suitable bearings, $c\,c$, on the framing A, and each shaft $b$ has a pinion, E, on it at one end. These pinions E E both gear into the teeth $a$ of the wheel C and at opposite points of said wheel.

To each drum D there is attached a rope, F. These ropes are wound on the drums D D' in the same direction as shown in Fig. 1, and they pass under fixed rollers G G in the lower part of the framing, one at each end.

To the shaft B there is connected a chain, H, the lower end of which is provided with one or more hooks for the purpose of attaching it to the stump to be raised, as shown in Fig. 1.

The operation is as follows: The machine is drawn to the place where it is to be used by the team which operates it in extracting the stumps, and the framing A, in order to facilitate the drawing of the machine, may be placed on rollers or a low truck. The framing A is adjusted over the stump to be extracted, so that the shaft B will be in a vertical plane which intersects the center of the stump, and the chain H is then secured to the stump in any proper way. A horse is attached to each rope F and the latter drawn out by the horses in the direction indicated by the arrows 1 1. This movement of the ropes F rotates the drums D D' in the direction indicated by the arrows 2 2, and the pinions E E, which of course rotate in the same direction, give motion to the wheel C, and the latter rotates shaft B, the chain H being wound upon it and raising or extracting the stump. By this arrangement it will be seen that both drums D D' may by their rotation be made to rotate the chain-shaft E, and that the power may be applied to one drum only, if desired. No sweeps are required, as in many stump-extractors, and the horses are required to walk in direct or straight lines only in order to operate the machine, and they may move a little either to the right or left in order to avoid obstructions which may be in their path. The machine, therefore, can be operated in all places or on any ground where it would be desirable to extract stumps. It may be very economically constructed, and is free from the objection of requiring horse-power attachments to operate it, as well as braces and other appliances to keep it in proper position while being operated, as the pull of the horses from two opposite ends keeps it in proper position.

A pawl, I, may be attached to the upper part of the framing, to catch into one of the pinions E to prevent the casual turning of shaft B when the machine is not at work.

Having thus described my invention, what I claim as new, and desire to secure by Letters Patent, is—

The combination of the gearing C E E with the shaft B and drums D D', the latter having the ropes F F wound on them in the same direction, and all arranged on a framing, A, for joint operation, as and for the purpose herein set forth.

CHARLES W. RAWSON.

Witnesses:
  E. C. GOODSPEED,
  CHAS. W. THORP.